United States Patent Office 3,090,353
Patented May 21, 1963

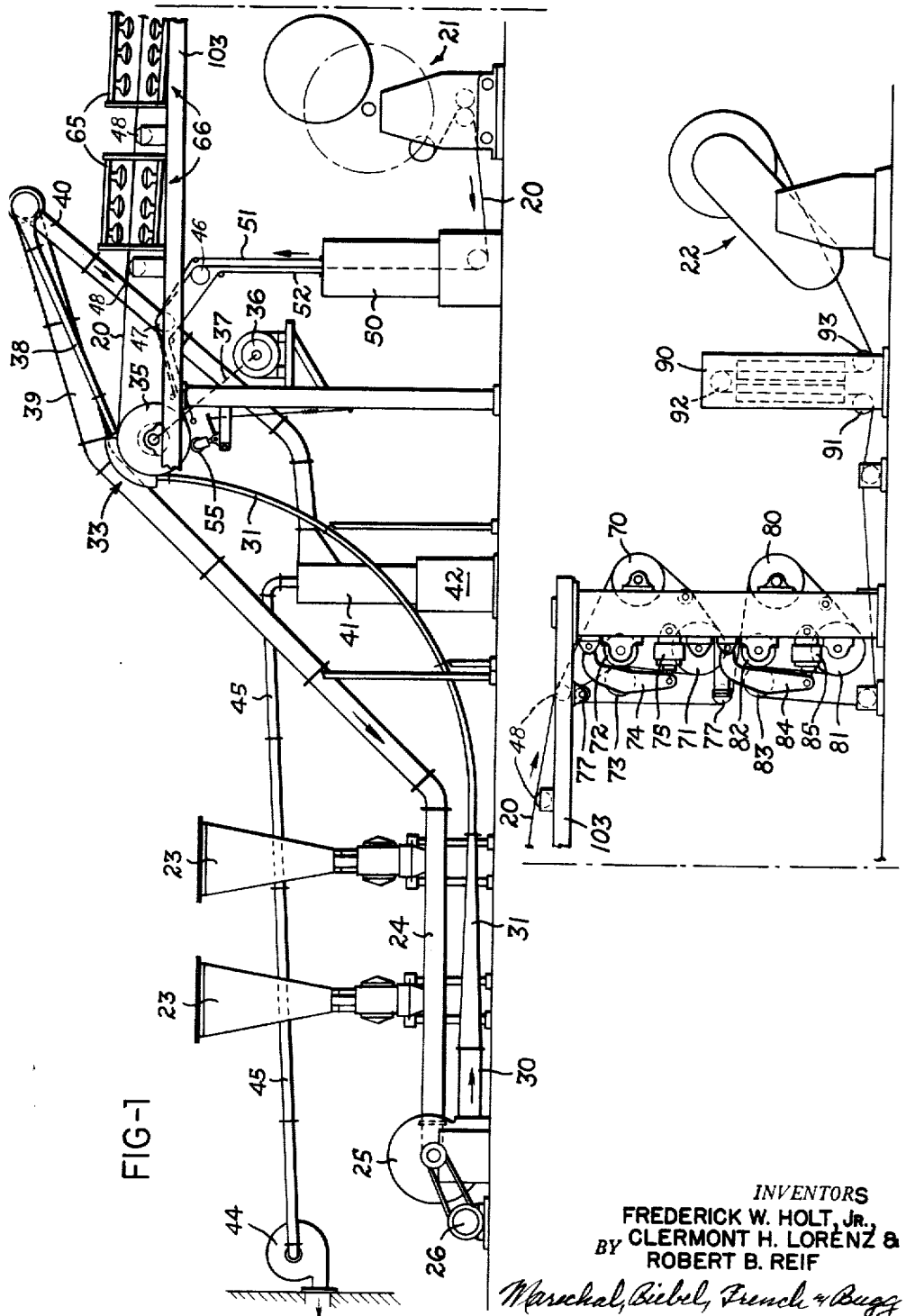

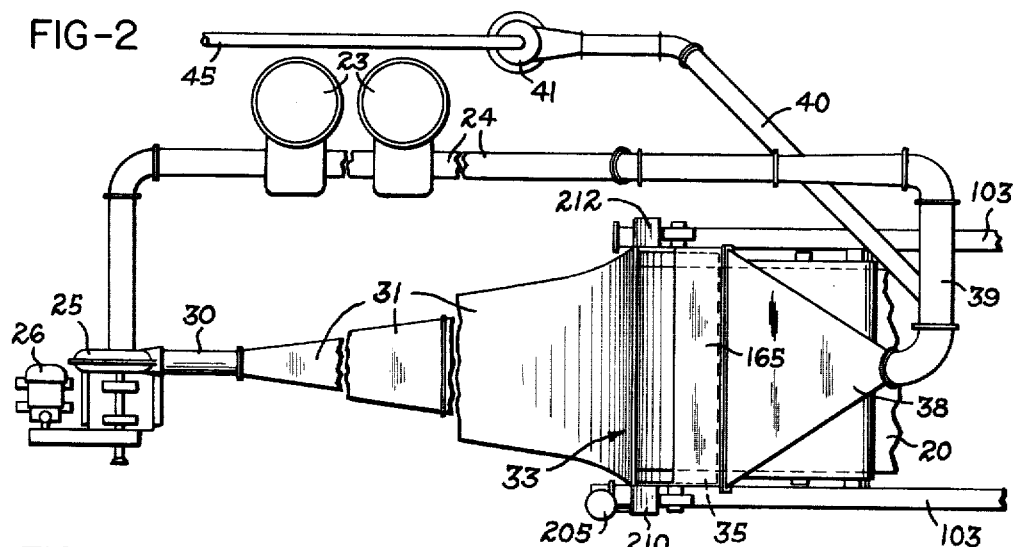
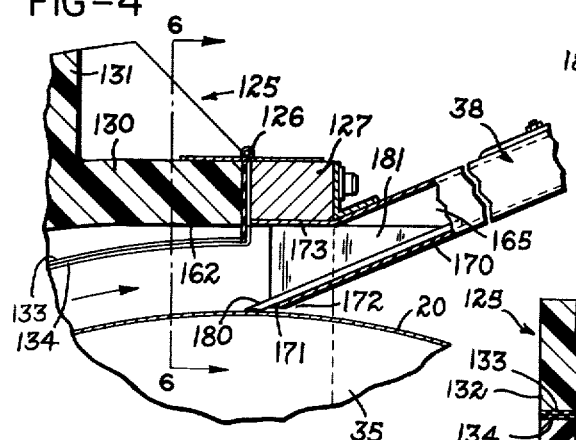
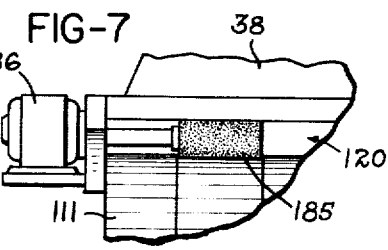
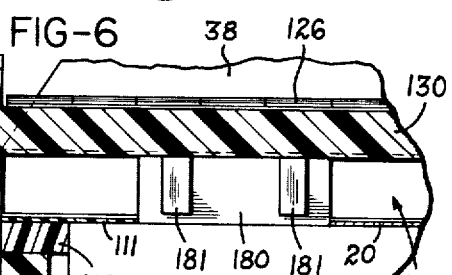
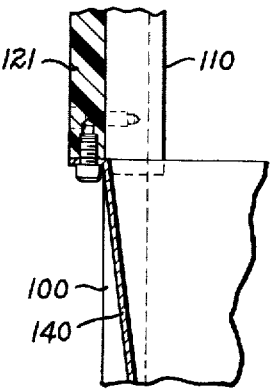

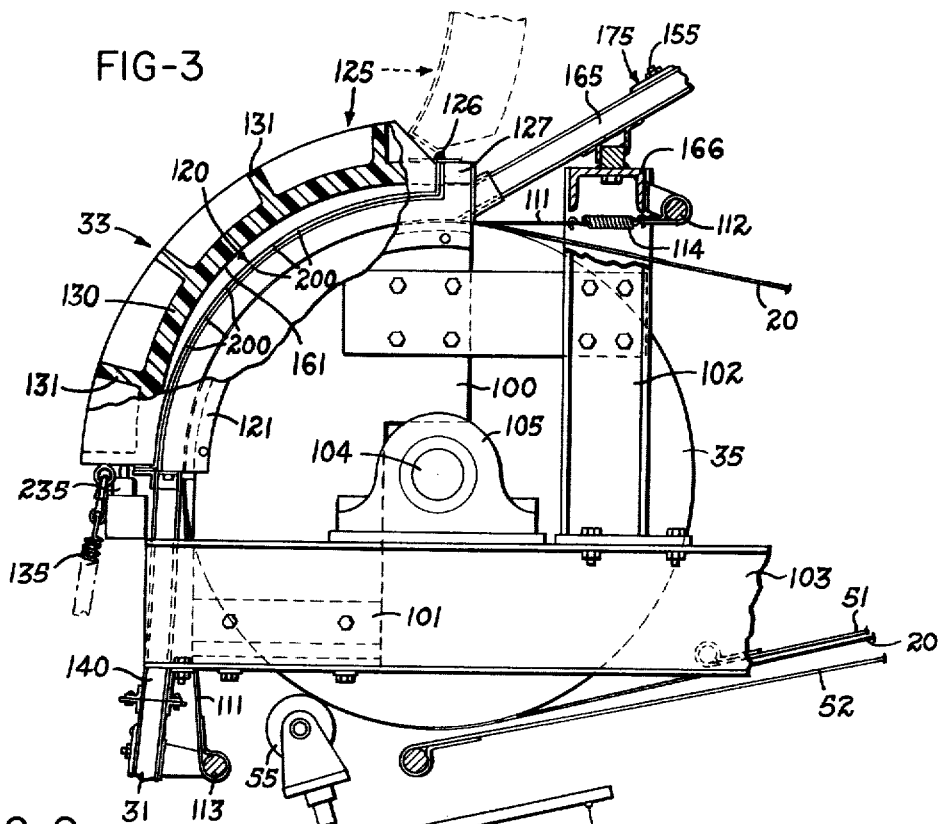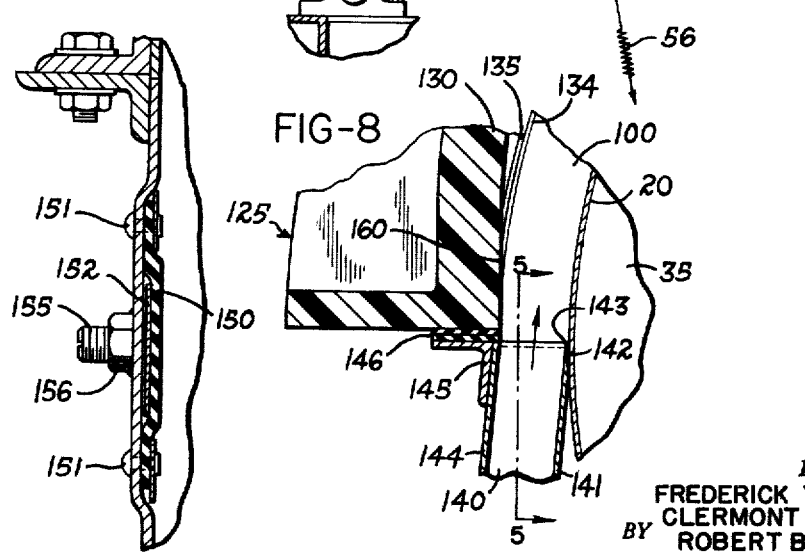

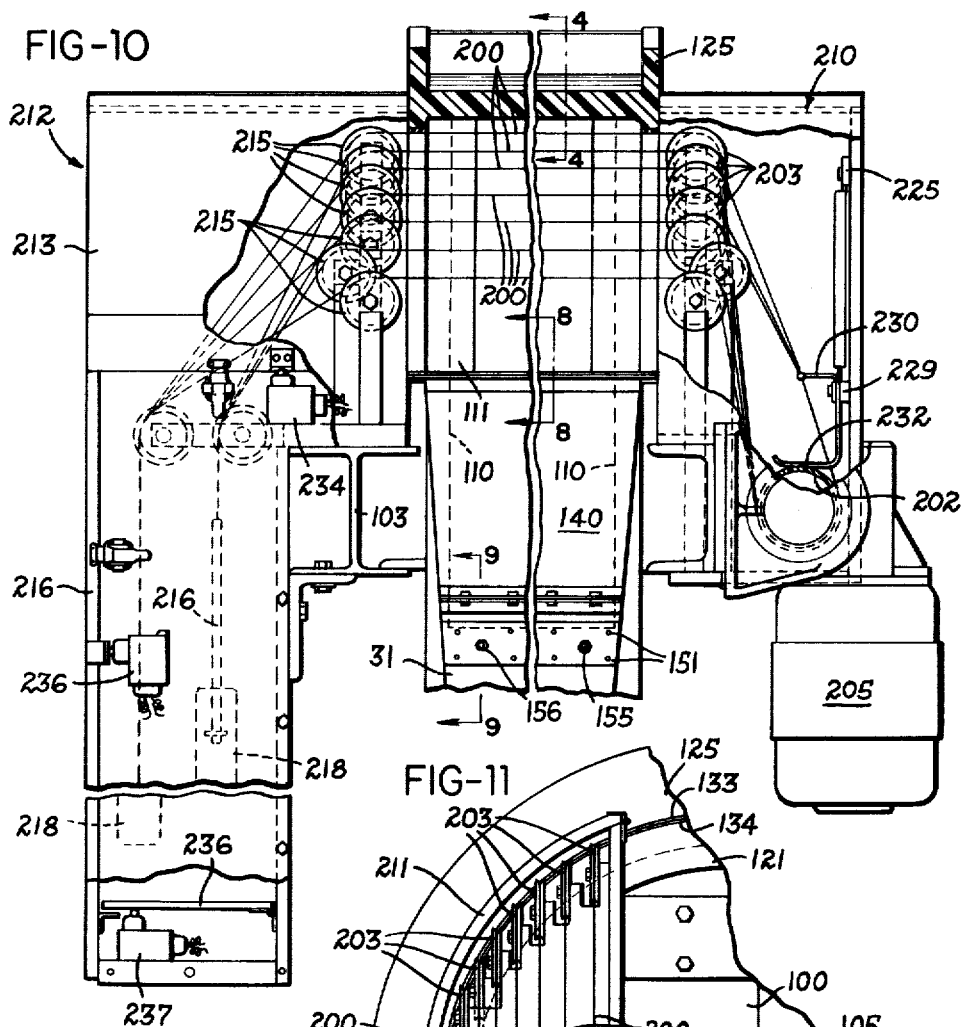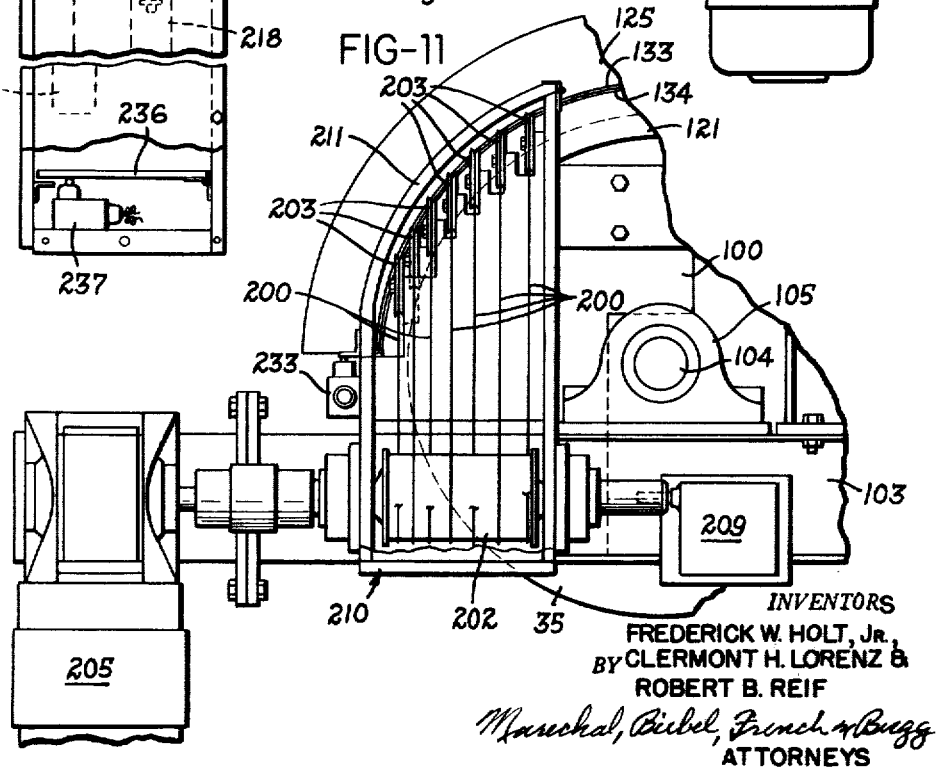

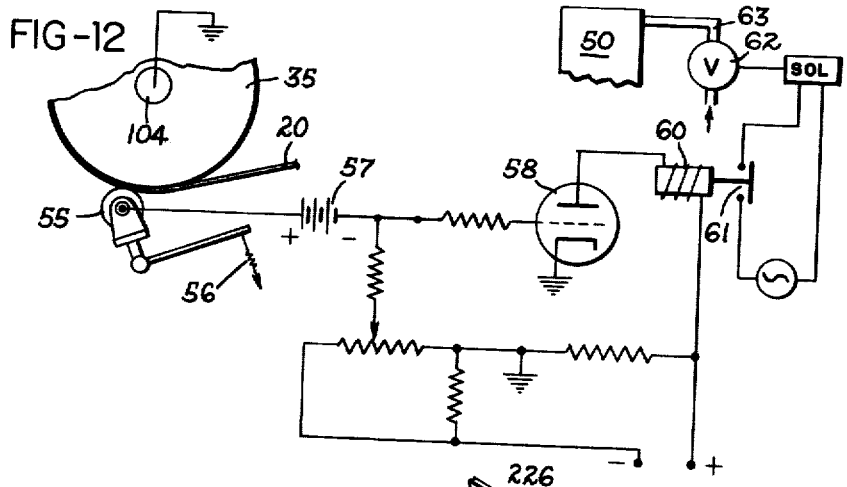

3,090,353
ELECTROSTATIC PRODUCTION OF
GUMMED WEB
Frederick W. Holt, Jr., Troy, Ohio, Clermont H. Lorenz, Baldwinsville, N.Y., and Robert B. Reif, Columbus, Ohio, assignors, by direct and mesne assignments, to The Brown-Bridge Mills, Inc., Troy, Ohio, a corporation of Ohio
Filed June 10, 1960, Ser. No. 35,219
19 Claims. (Cl. 118—621)

This invention relates to apparatus for coating paper and other web materials, and especially to apparatus for use in the commercial production of gummed paper having thereon an adhesive coating of the remoistenable type.

The invention has special relation to the coating methods and products thereof described in Holt et al. Serial No. 703,323, filed December 17, 1957, and assigned to the same assignee as the present application. That application is directed to the production of remoistenable gummed paper which is characterized by the ability to remain substantially flat over a wide range of humidity conditions. The application discloses that such product may be obtained by employing a mixture of a water soluble glue and a binder material both of which are produced in powder form and then applied as a mixture to the paper web by a technique of electrostatic precipitation producing a substantially uniform coating on the web. This powder coating is then secured to the web by fusing the particles of the binder material while maintaining the main glue constituent dispersed therein in powder form.

It is the primary object of the present invention to provide apparatus for the continuous commercial production of non-curling remoistenable gummed paper by a technique of electrostatic precipitation in accordance with the method of the above application.

It is a special object of this invention to provide apparatus for coating an advancing web which will continuously apply to the web a mixture of finely divided substantially non-thermoplastic glue and a thermoplastic binder material by means of electrostatic precipitation to produce a uniform coating of such powders on the web, and which will therefore continuously eject fusion and setting of the binder material to secure the non-thermoplastic particles to the web while maintaining them in essentially discrete condition.

Another object of this invention is to provide apparatus as outlined above which is of special construction and mode of operation for the purpose of assuring maximum uniformity in the powdered coating electrostatically applied on the advancing web in order to assure maximum uniformity of adhesive properties in the finished product.

An additional object of the invention is to provide apparatus as outlined above wherein the moisture content of the web is continuously maintained at optimum value for proper electrical conductivity during the electrostatic precipitation of the mixed powders thereon, and wherein the moisture content of the coated web following fusion of the binder material is maintained at an optimum value for resistance to curling.

It is a special object of this invention to provide apparatus as outlined above which incorporates special structural features assuring continuous cleaning of the wires which create the electrostatic field in order to prevent temporary deposit of the powder thereon, and it is similarly an object of the invention to provide a construction wherein vibration of these wires is minimized in order to promote uniformity of the field conditions.

It is also an object of the invention to provide apparatus as outlined above which is readily adjustable to the handling of webs of different widths without loss of effectiveness or efficiency.

Additional objects and advantages of the invention will be apparent from the following description, the accompanying drawings and the appended claims.

In the drawings—

FIG. 1 is a somewhat diagrammatic view in side elevation showing apparatus in accordance with the invention;

FIG. 2 is a diagrammatic top view of the apparatus of FIG. 1;

FIG. 3 is a view partly in side elevation and partly broken away in section showing the coating housing and coating rolls FIG. 4 is an enlarged fragmentary section taken as indicated by the line 4—4 of FIG. 10;

FIG. 5 is an enlarged fragmentary section on the line 5—5 of FIG. 8;

FIG. 6 is an enlarged fragmentary section on the line 6—6 of FIG. 4;

FIG. 7 is a fragmentary view similar to FIG. 6 but on a smaller scale and showing a modified construction;

FIG. 8 is an enlarged fragmentary section on the line 8—8 of FIG. 10;

FIG. 9 is an enlarged fragmentary section of 9—9 of FIG. 10;

FIG. 10 is a front view, partly broken away, showing the mechanism for mounting and reciprocating the charging wires in the coating housing;

FIG. 11 is a fragmentary view looking from right to left in FIG. 10 and with portions of the wire housing removed.;

FIG. 12 is a schematic wiring diagram showing the control system for maintaining a constant moisture supply in the web as it is coated; and FIG. 13 is a schematic wiring diagram showing the high voltage circuit for the charging wires and the arrangement for reciprocating these wires.

Referring to the drawings, which illustrate a preferred embodiment of the invention, the web 20 to be coated is supplied to the apparatus from a suitable unwind stand such as is indicated generally at 21 in FIG. 1, and the web having the finished coating thereon is rewound on the winder indicated at 22. The mixed powders to be applied to the web 20 are supplied by suitable hopper feeders 23 to the intake duct 24 leading to the intake or suction side of a blower 25 having a drive motor 26. The discharge side of the blower 25 is connected by a cylindrical pipe 30 to the laterally expanding duct 31 leading to the coating housing identified generally as 33 which partially overlies the coating or backing drum 35, and the driving connection for roll 35 to the main drive motor 36 for the apparatus is shown diagrammatically at 37. The pipe 30 and duct 31 are preferably of constant cross-sectional area to maintain uniform flow conditions for the powder to the housing 33, and the use of the cylindrical section of pipe 30 is important in assuring uniform distribution of the powder across the entire area of the duct 31.

Surplus powder from the housing 33 is conducted by a converging duct 38 and pipe 39 to the intake duct 24 of the blower 25. It has also been found desirable in accordance with the invention to apply continuous low vacuum to the exit end of the housing 33, and for this purpose a duct 40 is connected with the pipe 39 adjacent its connection to the duct 38 and leads to a cyclone separator 41 which removes powder from the air drawn through the duct 40, this powder being returned to a suitable collector 42. The vacuum applied to the duct 40 is created by an auxiliary blower 44 having its suction side connected by a pipe 45 with the discharge side of the cyclone separator 41. Guide rolls 46, 47 and 48 establish the path of the web to and from the coating housing 33 and drum 35.

As is described in detail hereinafter, means are provided within the coating housing 33 for creating an electrostatic field which in turn causes the powder supplied to the housing to be applied as a coating on the exposed surface of the web 20 as the web moves through the housing on the grounded drum 35. If the web 20 is of a normally non-conducting material such as paper or cloth, it is desirable to assure uniform coating conditions by maintaining sufficient moisture in the web to impart uniform conductive properties thereto, and provision is made for establishing conditions of substantially uniform moisture content in the web as it reaches the coating housing. For this purpose, the web is passed through a moisturizing unit 50 such as a steam chamber located between the unwind stand 21 and the drum 35.

The moisture content of the web is protected against evaporation during its passage from the unit 50 to the coating housing by a suitable enveloping structure, and satisfactory results have been obtained by enclosing the web between a pair of felt blankets 51 and 52 depending from the upper structure of the apparatus as shown in FIG. 1. In addition, the moisturizing action of the unit 50 is controlled to maintain a substantially constant moisture content in the web as it enters the coating housing in order to maintain similarly constant conductive properties in the web during the electrostatic coating operation.

Referring to FIGS. 3 and 12, a feeler in the form of a small roll 55 is mounted on the frame and counterbalanced at 56 toward the drum 35 to provide a ground connection through the web 20 for one side of the battery 57 which is connected to control the bias on the grid of the tube 58. As shown, this circuit arrangement is such that when the electrical resistance of the web increases beyond a predetermined value, the tube 58 will conduct and thereby energize the coil of the relay 60. When this occurs, the contacts 61 of relay 60 will close to complete the energizing circuit for a solenoid valve 62 which controls the steam supply line 63 to the moisturizer 50, thereby opening this valve and causing steam to be supplied to the unit 50 until the moisture content of the web has been increased sufficiently to lower its resistance and raise its conductivity to the desired range. If this web 20 is a normally conducting material such as metal foil, the moisturizing unit 50 is not used.

In accordance with the above Holt et al. application, the powdered coating applied to the web 20 in the housing 33 comprises a major proportion of a water soluble glue and a minor proportion of a binder material which is capable of fusion by heat without affecting the powdered condition of the glue. Accordingly, after the coated web 20 leaves the housing 33, it is conducted to a series of rolls for carrying out the desired fusion and setting of the binder material to secure the powdered glue to the web, and before reaching these rolls, it may be subjected to a preliminary heating by passage between heaters 65 and 66 such as batteries of infrared lights to eliminate some moisture from the web and thus to prevent undue shrinkage thereof during the fusing of the coating.

Referring to the lower portion of FIG. 1, the coated web 20 passes first around a heated roll 70 with its uncoated surface contacting this roll, and the roll 70 is heated to a sufficiently high temperature to fuse the binder component of the powdered coating at the desired rate of travel of the web. The web 20 then passes from the roll 70 to a roll 71 which is chilled to effect a rapid setting of the fused binder material, satisfactory results having been obtained by circulating water at 60° F. through the roll 71.

From the setting roll 71, the web passes between a pair of press rolls 72—73 forming a calendering unit, the roll 73 being carried by pivoted arms 74 equipped with pressure cylinders 75 for maintaining a desired pressure in the nip of the rolls 72—73 which will effect a desired calendering action on the coating. The web then passes around guide rolls 77 to a second similar series of rolls comprising a heated roll 80, a cold roll 81, and a pair of calender rolls 82—83, the roll 83 being carried by pivoted arms 84 operated by pressure cylinders 85.

It has been found in operation with webs which contain substantial moisture that the heat necessary for fusion of the binder material in the coating may cause excess removal of moisture from the body of the web, and it has therefore been found desirable with such webs to restore some moisture to the web before it reaches the winder 22. An additional moisturizing unit 90 is accordingly shown as located between the several treating rolls and the winder 22, and the web is guided therethrough by means of guide rolls 91, 92 and 93. It has also been desirable to chill the web before it is rewound, and satisfactory results for this purpose have been obtained by circulating cold water through the guide roll 93.

The coating housing 33 is shown in detail in FIGS. 3–11. The housing includes end walls 100 of a suitable non-conducting material such as a plastic which are mounted by means of brackets 101 and 102 on the I-beams 103 which form the upper structure of the main frame for the apparatus as a whole. The journals 104 for the drum 35 project beyond the housing walls 100 and are supported on the I-beams 103 by suitable bearings as indicated at 105, thereby conveniently providing the necessary grounding connection for the drum to the frame.

The upper portion of each of the end walls 100 is curved concentrically with the drum 35 and is provided with a rim member 110 which is curved in accurate alignment with the surface of the drum 35 as best seen in FIG. 6. A running seal is provided between each rim member 110 and the drum 35 by a deckle strap 111 of suitably low friction and non-conducting material such as polyethylene and of sufficient width to cover the gap between the drum 35 and the adjacent rim member 110. Each deckle 111 should be of adequate length to extend at both ends beyond the housing 33 for anchoring to the frame in any convenient way as indicated at 112 and 113 in FIG. 3, the spring loading at 114 being desirable.

The actual coating operation is carried out in the crescent-shaped chamber 120 which overlies approximately 90° of the surface of the drum 35. This chamber 120 is in part enclosed at its ends by shields 121 of arcuate shape each of which is secured to the outer surface of the adjacent end wall 100 and projects above the adjacent rim member 110. A hood identified generally as 125 overlies and covers the chamber 120 and is hinged at 126 to a supporting bar 127.

The hood 125 includes a curved main section 130, a series of reinforcing ribs 131 on its outer surface, and end walls 132 which project radially inwardly of the inner surface of the main section 130. In the closed position of the hood 125, its end walls 132 engage the end shields 121, and the edges of these engaging members are both preferably provided with yieldable sealing steps 133 and 134 which may advantageously be formed of sponge rubber. The hood 125 is held yieldably closed by means of springs 135 connected thereto and to the main frame, and this arrangement provides a safety factor in that in the event of an explosion within the chamber 120, the hood can open against the biasing force of the springs 135.

Referring to FIGS. 3, 5 and 9—10, an inlet duct 140 is connected to the housing end shields 121 as shown in FIG. 5 and connects at its lower end to the duct 31, and its upper end leads directly into the lower end of the chamber 120. The upper end of the inlet duct 140 includes a straight inner wall 141 which is in sufficiently close relation to the surface of the drum 35 to define a narrow entry slot 142 for the web 20 minimizing the possibility of loss of powder therebetween, and it will be noted that the guide rolls 46 and 47 guide the web toward the drum along such a path that the web travels on the drum for a substantial angular distance before reaching the slot 142. Also, as best seen in FIG. 8, the wall 141 is provided with a knife edge 143 to minimize the possibility of accumulation of powder thereon. The outer wall 144 of duct 140 is provided with an angle 145 which forms a seat for the lower edge of the hood section 130, and the junction of these parts is provided with one or more sealing gaskets 146.

Provision is made for regulating the cross-sectional area of the duct 31 at a position closely adjacent the chamber 120 for the purpose of assuring maximum uniformity of distribution in the supply of powder across the entire length of chamber 120. Referring to FIG. 9, a rubber diaphragm 150 extends across the full width of the inner surface of the duct 31 and is secured to one wall thereof as by a series of rivets 151. A strip 152 of spring steel extends similarly across the duct between the gasket 150 and the adjacent duct wall, and multiple adjusting screws 155 are threaded through nuts 156 welded to the outer surface of this duct wall. The screws 155 extend freely through matching holes in the duct wall for engagement with the spring strip 152, and these screws may be adjusted individually as desired to flex the diaphragm 150 through the spring strip 152 and thereby to produce local adjustment in the cross-sectional area of the duct 31.

Referring now to FIG. 8, the main hood section 130 is contoured so that in the closed position of the hood, its inner surface forms a continuation of the inner surface of the duct wall 144. The lower portion 160 of the surface of the hood wall is essentially flat so that it diverges from the adjacent surface portion of the drum 35 and thereby causes the chamber 120 to widen so that the powder entering from duct 140 will decelerate as it reaches the middle of the chamber. The major portion 161 of the hood surface is curved generally concentrically with the drum 35 in the closed position of the hood, and another straight area 162 leads from this curved area 161 to the upper end of the hood. This hood surface 162 connects directly with the inner end of the exit duct 165 for surplus powder as now described.

Referring particularly to FIGS. 3 and 4, the exit duct 165 is supported on a beam 166 which is secured between the brackets 102, and the inlet end portion of the duct 165 also foms the support for the bar 127 to which the hood 125 is hinged. The duct 165 includes a lower wall 170 which is formed to an essentially knife edge 171 at its closest position to the surface of the drum 35 to minimize the possibility for escape of the loose powder from the chamber 120 through the slot 172 where the coated web makes its exit from this chamber, and for preferred results the width of this slot should not exceed approximately one-quarter inch. The upper wall of the duct 165 includes an inner end portion 173 which diverges from the lower wall 170 to aid in funneling loose powder into the duct 165, and the discharge end of the duct 165 connects directly with the converging duct 38.

As already noted, the portion of the coating chamber adjacent the exit duct is maintained under negative pressure by means of the blower 44 to draw undeposited powder into the duct 165 and thereby to prevent it from escaping through the exit slot 172. In addition, the duct 38 is provided with an adjusting mechanism inducted at 175 as identical with the assembly 150–156 for assuring uniform velocity flow therethrough. The stability of the coating is further aided by guiding the web, as by means of the guide rolls 48 and heated roll 70, into maintained contact with the drum 35 for a substantial angular distance beyond the exit slot 172 as best seen in FIGS. 3 and 4.

Under some conditions, it is practicable to employ deckles 111 of the proper width to cover all of the area of the drum beyond the side edges of the web, but it has generally been found more satisfactory to utilize deckles of relatively narrow width as shown and to make other provision for removing powder from the resulting exposed area of the drum. For example, referring to FIGS. 4 and 6, a doctor blade 180 may be mounted in position at each end of the drum to scrape its exposed surface area between the edge of the web and the adjacent deckle. In FIG. 6 the doctor blade 180 is held in position by wedges 181 which are secured to its upper surface and fit into the funnel shaped opening the end of the exit duct 165. The powder doctored from the drum is thus immediately and continuously removed through the duct 165, and doctor blades 180 of different widths may be substituted for each other depending upon the width of the web 20 to be coated.

An alternative doctor arrangement is shown in FIG. 7 as comprising a rotary brush 185 of the proper length in accordance with the exposed area of the drum. The brush 185 may be readily mounted as shown on the side of the exit duct 165 and provided with its own drive motor 186 arranged to drive in such direction that its periphery moves through its nip with the drum in the direction opposite to the direction of movement of the drum surface.

An electrostatic field is generated within the chamber 120 by a plurality of charging wires 200 which extend through approximately the middle of this chamber as best seen in FIG. 10. These wires 200 are individually connected to a suitable high voltage source as described hereinafter, and provision is made for causing them to reciprocate continuously in order to prevent accumulation of powder thereon which could then drop and form lumps in the coating. For this purpose the wires 200 are arranged to overlie the sealing strips 134 on the end shields, and they are thus compressed between the engaged sealing strips 133—134 in the closed position of the hood so that these sealing strips provide a wiping action thereon as the wires reciprocate.

The arrangement for mounting and reciprocating the wires 200 is best seen in FIGS. 10 and 11. At one end of the housing 33 is a reel 202 having an insulated surface to which one end of each of the wires 200 is fastened, and it will be noted that alternate wires are guided by their associated series of pulleys 203 to opposite sides of the reel so that adjacent wires move in opposite directions as the reel rotates. The reel 202 is driven by a reversible electric motor 205 at a relatively low rate of speed which will provide for linear movement of the wires at a suitably slow rate such as approximately 20 feet per minute. Convenient reversing control for the motor 205 is provided by a reversing switch 206 operated by a suitable cam 207 driven through a suitable reduction gearing 208 from the same shaft which carries the reel 202, the parts 206–208 being shown in FIG. 11 as enclosed in a switch housing 209. The reel 202 and pulley 203 are enclosed in a suitable housing 210 provided with a cover 211.

At the opposite end of the housing 33 from the housing 210 is a similar housing 212 and cover 213 which enclose a series of pulleys 215 for guiding alternate wires 200 to opposite sides of the extended lower portion of the housing 212, which has a side door 216. Each of the wires 200 is connected through an insulator 217 to a weight 218 which maintains the wire taut as it reciprocates in response to the rotation of the reel 202. This reciprocating arrangement for the wires thus assures that any powder which collects on a wire will be removed before it can drop onto the web and cause a defect in the coating. Also, with adjacent wires always moving in opposite directions, if any wire should have a defective portion capable of affecting uniform deposit of the powder on the web, the position of such portion will constantly change with respect to the other wires and will thus be prevented from developing a pattern of bad spots in the coating such as could occur if the wires all moved in the same direction at the same time.

The high voltage circuit for the charging wires 200 is shown diagrammatically in FIG. 13. A high voltage source 220 having primary leads 221 is connected by a main lead 222 to a bus bar 225 mounted within the housing 210. A series of individual lines 226 each including a plurality of resistors 227 lead to individual terminals 228 on an insulating mounting 229. Each of the wires 200 which runs around the side of the reel 202 near the terminals 228 is connected to one of these terminals by running through a hook 230 secured to the associated terminal. Each of the other wires 200 is connected with its associated terminal 228 by a spring finger 232 extending from the proper terminal into biased engagement with the wire on the insulated surface of the reel 202.

Safety switches are incorporated in the high voltage circuit, and they may be advantageously connected in series in one of the primary lines 221. The switches 233 and 234 are mounted on the housing 210 and 212 respectively in such manner that they are held closed only when the associated housing cover 211 or 213 is closed, and the switch 235 is similarly held closed by the hood 125. The switch 236 is held closed by the housing door 216, and the switch 237 is mounted at the bottom of the housing 212 below the pivoted plate 238. If any of the wires 200 should break, its associated weight 217 will drop on the plate 238 and thereby open switch 237 to break the high voltage circuit. Preferably the wiring of the apparatus will also be such that whenever one of switches 233—237 is opened, the motor 205 will also be stopped.

The operation of the apparatus of the invention will in large measure be apparent from the above detailed description. With the web of naturally or maintained constant electrically conductive properties as described, a powder coating of uniform physical characteristics is deposited thereon as it passes through the coating housing, and this coating is secured thereto during the passage of the web over the hot and cold rolls and between the calender rolls at the finishing end of the apparatus. The preliminary heating of the web by the heaters 65—66 has been found especially helpful when the web is travelling at comparatively low speed, but at web speeds of the order of 125 ft. per minute and above, such preliminary heating is usually found to be unnecessary. Similarly, the desirability of the second moisturizing unit 90 depends on the final moisture content required in the web, and its operation is readily controlled by the provision of the same type of resistance-measuring unit and control circuit as described in connection with FIG. 12 for the moisturizing unit 50.

The construction and arrangement of the powder supply and recirculating system has been found especially important in obtaining uniform results of high quality. In particular, the closed circuit for the powder in combination with the means for placing the exit duct under suction, has been found of great benefit in obtaining a uniform coating while preventing escape of free powder from the coating housing. The reciprocating arrangement for the charging wires is also important in obtaining the desired results, for the reasons already noted.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Coating apparatus for providing an advancing web with a coating consisting essentially of a finely divided substantially nonthermoplastic material and a finely divided thermoplastic binder material, comprising a driven backing drum, hood means defining a coating chamber overlying an angular portion of the surface of said drum, means defining entry and exit slots for the web with respect to said chamber, means including an entry duct leading to said entry slot for supplying to said chamber a mixture of said finely divided material, means including a plurality of charging wires extending through said chamber axially of said drum and in radially spaced overlying relation therewith for charging said finely divided materials, means for connecting said wires to a high voltage source, means for grounding said drum, means guiding the web into contact with said drum from a position angularly ahead of said entry slot to a position angularly beyond said exit slot to cause said charged materials to deposit on the web, a heated roll arranged to receive the uncoated side of the web therearound from said chamber to effect fusion of said thermoplastic material in the coating on the web, a chilled roll arranged to receive the uncoated side of the web from said heated roll to effect setting of said fused material, and a pair of rolls forming a pressure nip arranged to receive the web from said chilled roll to effect calendering of said coating.

2. Coating apparatus for providing an advancing web with a coating consisting essentially of a finely divided substantially nonthermoplastic material and a finely divided thermoplastic binder material, comprising a driven backing drum, hood means defining a coating chamber overlying an angular portion of the surface of said drum, means defining entry and exit slots for the web with respect to said chamber, means including an entry duct leading to said entry slot for supplying to said chamber a mixture of said finely divided material, means including a plurality of charging wires extending through said chamber axially of said drum and in radially spaced overlying relation therewith for charging said finely divided materials, means for connecting said wires to a high voltage source, means for grounding said drum, means guiding the web into contact with said drum from a position angularly ahead of said entry slot to a position angularly beyond said exit slot to cause said charged materials to deposit on the web, means forming running seals between the end portions of said drum and said hood means to prevent escape of said materials laterally of said drum, means for continually cleaning said wires to prevent deposit of said materials thereon, a heated roll arranged to receive the uncoated side of the web therearound from said chamber to effect fusion of said thermoplastic material in the coating on the web, a chilled roll arranged to receive the uncoated side of the web from said heated roll to effect setting of said fused material, and a pair of rolls forming a pressure nip arranged to receive the web from said chilled roll to effect calendering of said coating.

3. Coating apparatus for providing an advancing web with a coating consisting essentially of a finely divided substantially nonthermoplastic material and a finely divided thermoplastic binder material, comprising a driven backing drum, hood means defining a coating chamber overlying an angular portion of the surface of said drum, means defining entry and exit slots for the web with respect to said chamber, means including an entry duct leading to said entry slot for supplying to said chamber a mixture of said finely divided material, means including a plurality of charging wires extending through said chamber axially of said drum and in radially spaced overlying relation therewith for charging said finely divided materials, means for connecting said wires to a high voltage source, means for grounding said drum, means guiding the web into contact with said drum within said chamber to cause said charged materials to deposit on the web, wiper means adjacent each end of said drum receiving said wires in running engagement therepast, means causing reciprocating movement of said wires to clean said wires of any of said materials deposited thereon, a heated roll arranged to receive the uncoated side of the web therearound from said chamber to effect fusion of said thermoplastic material in the coating on the web, a chilled roll arranged to receive the uncoated side of the web from said heated roll to effect setting of said fused material, and a pair of rolls forming a pressure nip arranged to receive the web from chilled roll to effect calendering of said coating.

4. Coating apparatus for providing an advancing web with a coating consisting essentially of a finely divided substantially nonthermoplastic material and a finely divided thermoplastic binder material, comprising a driven backing drum, hood means defining a coating chamber overlying an angular portion of the surface of said drum, means defining entry and exit slots for the web with respect to said chamber, means including an entry duct leading to said entry slot for supplying to said chamber a mixture of said finely divided material, means including a plurality of charging wires extending through said chamber axially of said drum and in radially spaced overlying relation therewith for charging said finely divided materials, means for connecting said wires to a high voltage source, means for grounding said drum, means guiding the web into contact with said drum within said chamber to cause said charged materials to deposit on the web, means forming running seals between the side edges of the web and said hood means to prevent escape of said materials laterally of said drum, means guiding said wires in wiping running engagement through said seal means, means causing reciprocating movement of said wires to clean said wires at said seal means of any of said materials deposited thereon, and means receiving the coated web from said drum and causing fusion and setting of said thermoplastic material in said coating to secure said non-thermoplastic material to the web.

5. Coating apparatus for providing an advancing web with a coating consisting essentially of a finely divided substantially nonthermoplastic material and a finely divided thermoplastic binder material, comprising a driven backing drum, hood means defining a coating chamber overlying an angular portion of the surface of said drum, means defining entry and exit slots for the web with respect to said chamber, means including an entry duct leading to said entry slot for supplying to said chamber a mixture of said finely divided material, means including a plurality of charging wires extending through said chamber axially of said drum and in radially spaced overlying relation therewith for charging said finely divided materials, means for connecting said wires to a high voltage source, means for grounding said drum, means for applying moisture to the web in advance of said drum, means controlling said moisture applying means to maintain substantially constant the moisture content of the web, means guiding the web into contact with said drum within said chamber to cause said charged materials to deposit on the web, a heated roll arranged to receive the uncoated side of the web therearound from said chamber to effect fusion of said thermoplastic material in the coating on the web, a chilled roll arranged to receive the uncoated side of the web from said heated roll to effect setting of said fused material, and a pair of rolls forming a pressure nip arranged to receive the web from said chilled roll to effect calendering of said coating.

6. Coating apparatus for providing an advancing web with a coating consisting essentially of a finely divided substantially nonthermoplastic material and a finely divided thermoplastic binder material, comprising a driven backing drum, hood means defining a coating chamber overlying an angular portion of the surface of said drum, means defining entry and exit slots for the web with respect to said chamber, means including an entry duct leading to said entry slot for supplying to said chamber a mixture of said finely divided material, means including a plurality of charging wires extending through said chamber axially of said drum and in radially spaced overlying relation therewith for charging said finely divided materials, means for connecting said wires to a high voltage source, means for grounding said drum, means guiding the web into contact with said drum from a position angularly ahead of said entry slot to a position angularly beyond said exit slot to cause said charged materials to deposit on the web, means for applying moisture to the web in advance of said drum, means for measuring the moisture content of the web at said drum, means controlled by said measuring means for regulating said moisture applying means to maintain substantially constant the moisture content of the web, and means effecting fusion and setting of said thermoplastic material in said coating to secure said nonthermoplastic materials to the web.

7. Coating apparatus for providing an advancing web with a coating consisting essentially of a finely divided substantially nonthermoplastic material and a finely divided thermoplastic binder material, comprising a driven backing drum, hood means defining a coating chamber overlying an angular portion of the surface of said drum, means defining entry and exit slots for the web with respect to said chamber, means including an entry duct leading to said entry slot for supplying to said chamber a mixture of said finely divided material, means including a plurality of charging wires extending through said chamber axially of said drum and in radially spaced overlying relation therewith for charging said finely divided materials, means for connecting said wires to a high voltage source, means for grounding said drum, means located ahead of said drum for maintaining a substantially constant supply of moisture in the web to increase the electric conductivity thereof, means guiding the moistened web into contact with said drum within said chamber to cause said charged materials to deposit on the moistened web, means for effecting preliminary heating of the coated web to eliminate some moisture therefrom, means for applying to the heated web sufficient additional heat to fuse said thermoplastic material in said coating and means for effecting setting of said fused material to secure said nonthermoplastic material to the web.

8. Coating apparatus for providing an advancing web with a coating consisting essentially of a finely divided substantially nonthermoplastic material and a finely divided thermoplastic binder material, comprising a driven backing drum, hood means defining a coating chamber overlying an angular portion of the surface of said drum, means defining entry and exit slots for the web with respect to said chamber, means including an entry duct leading to said entry slot for supplying to said chamber a mixture of said finely divided material under pressure, means including a plurality of charging wires extending through said chamber axially of said drum and in radially spaced overlying relation therewith for charging said finely divided materials, means for connecting said wires to a high voltage source, means for grounding said drum, means guiding the web into contact with said drum from a position angularly ahead of said entry slot to a position angularly beyond said exit slot to cause said charged materials to deposit on the web, an exit duct leading from said chamber adjacent said exit slot, means for applying suction to said exit duct downstream thereof from said chamber to induce flow therethrough of undeposited said materials from said chamber, and means effecting fusion and setting of said thermoplastic material in said coating to secure said nonthermoplastic material to the web.

9. Coating apparatus for providing an advancing web with a coating consisting essentially of a finely divided substantially nonthermoplastic material and a finely divided thermoplastic binder material, comprising a driven backing drum, hood means defining a coating chamber overlying an angular portion of the surface of said drum, means defining entry and exit slots for the web with respect to said chamber, means including an entry duct leading to said entry slot substantially tangentially of said drum for supplying to said chamber a mixture of said finely divided material under pressure, said chamber being of substantially greater flow area than said duct and entry slot to effect deceleration of said materials within said chamber, means including a plurality of charging wires extending through said chamber axially of said drum and in radially spaced overlying relation therewith for charging said finely divided materials, means for connecting said wires to a high voltage source, means for grounding said drum, means guiding the web into contact with said drum from a position angularly ahead of said entry slot to a position angularly beyond said exit slot to cause said charged materials to deposit on the web, means separate from said exit slot for continuously effecting removal of undeposited said materials from said chamber, and means effecting fusion and setting of said thermoplastic material in said coating to secure said nonthermoplastic material to the web.

10. Coating apparatus for providing an advancing web with a coating consisting essentially of a finely divided substantially nonthermoplastic material and a finely divided thermoplastic binder material, comprising a driven backing drum, hood means defining a coating chamber overlying an angular portion of the surface of said drum, means defining entry and exit slots for the web with respect to said chamber, means including an entry duct leading to said entry slot substantially tangentially of said drum for supplying to said chamber a mixture of said finely divided material under pressure, said chamber being of substantially greater flow area than said duct and entry slot to effect deceleration of said materials within said chamber, means including a plurality of charging wires extending through said chamber axially of said drum and in radially spaced overlying relation therewith for charging said finely divided materials, means for connecting said wires to a high voltage source, means for grounding said drum, means guiding the web into contact with said drum from a position angularly ahead of said entry slot to a position angularly beyond said exit slot to cause said charged materials to deposit on the web, an exit duct leading from said chamber adjacent said exit slot and substantially tangentially of said drum, means for applying suction to said exit duct downstream thereof from said chamber to induce flow therethrough of undeposited said materials from said chamber, and means effecting fusion and setting of said thermoplastic material in said coating to secure said nonthermoplastic material to the web.

11. Coating apparatus for providing an advancing web with a coating consisting essentially of a finely divided substantially nonthermoplastic material and a finely divided thermoplastic binder material, comprising a driven backing drum, hood means defining a coating chamber overlying an angular portion of the surface of said drum, means defining entry and exit slots for the web with respect to said chamber, means including an entry duct leading to said entry slot for supplying to said chamber a mixture of said finely divided material under pressure, said chamber being of substantially greater flow area than said duct and entry slot to effect deceleration of said materials within said chamber, means including a plurality of charging wires extending through said chamber axially of said drum and in radially spaced overlying relation therewith for charging said finely divided materials, means for connecting said wires to a high voltage source, means for grounding said drum, means guiding the web into contact with said drum from a position angularly ahead of said entry slot to a position angularly beyond said exit slot to cause said charged materials to deposit on the web, means defining an exit duct leading from said chamber from a position closely adjacent and radially overlying said exit slot, and means effecting fusion and setting of said thermoplastic material in said coating to secure said nonthermoplastic material to the web.

12. Coating apparatus for providing an advancing web with a coating consisting essentially of a finely divided substantially non-thermoplastic material and a finely divided thermoplastic binder material, comprising a driven backing drum, hood means defining a coating chamber overlying an angular portion of the surface of said drum, means defining entry and exit slots for the web with respect to said chamber, means including an entry duct leading to said entry slot for supplying to said chamber a mixture of said finely divided material, means including a plurality of charging wires extending through said chamber axially of said drum and in radially spaced overlying relation therewith for charging said finely divided materials, means for connecting said wires to a high voltage source, means for grounding said drum, means guiding the web into contact with said drum within said chamber to cause said charged materials to deposit on the web, means forming running seals between the end portions of said drum and said hood means to prevent escape of said materials laterally of said drum, a heated roll arranged to receive the uncoated side of the web therearound from said chamber to effect fusion of said thermoplastic material in the coating on the web, means located between said drum and said heated roll for effecting preliminary heating of the web to eliminate some moisture therefrom, a chilled roll arranged to receive the uncoated side of the web from said heated roll to effect setting of said fused material, and a pair of rolls forming a pressure nip arranged to receive the web from said chilled roll to effect calendering of said coating.

13. Coating apparatus for providing an advancing web with a coating consisting essentially of a finely divided substantially nonthermoplastic material and a finely divided thermoplastic binder material, comprising a driven backing drum, hood means defining a coating chamber overlying an angular portion of the surface of said drum, means defining entry and exit slots for the web with respect to said chamber, means including an entry duct leading to said entry slot for supplying to said chamber a mixture of said finely divided material, means including a plurality of charging wires extending through said chamber axially of said drum and in radially spaced overlying relation therewith for charging said finely divided materials, means for connecting said wires to a high voltage source, means for grounding said drum, means located ahead of said drum for maintaining a substantially constant supply of moisture in the web to increase the electric conductivity thereof, means guiding the moistened web into contact with said drum within said chamber to cause said charged materials to deposit on the moistened web, means forming running seals between the side edges of said drum and said hood means to prevent escape of said materials laterally of said drum, a heated roll arranged to receive the uncoated side of the web therearound from said chamber to effect fusion of said thermoplastic material in the coating on the web, means located between said drum and said heated roll for effecting preliminary heating of the web to eliminate some moisture therefrom, a chilled roll arranged to receive the uncoated side of the web from said heated roll to effect setting of said fused material, and a pair of rolls forming a pressure nip arranged to receive the web from said chilled roll to effect calendering of said coating.

14. Coating apparatus for providing an advancing web with a coating consisting essentially of a finely divided substantially non-thermoplastic material and a finely divided thermoplastic binder material, comprising a driven backing drum, hood means defining a coating chamber overlying an angular portion of the surface of said drum, means defining entry and exit slots for the web with respect to said chamber, means including an entry duct leading to said entry slot for supplying to said chamber a mixture of said finely divided material, means including a plurality of charging wires extending through said chamber axially of said drum and in radially spaced overlying relation therewith for charging said finely divided materials, means for connecting said wires to a high voltage source, means for grounding said drum, means guiding the web into contact with said drum to cause said charged materials to deposit on the web, a heated roll arranged to receive the uncoated side of the web therearound from said chamber to effect fusion of said thermoplastic material in the coating on the web, a chilled roll arranged to receive the uncoated side of the web from said heated roll to effect setting of said fused material, a pair of rolls forming a pressure nip arranged to receive the web from said chilled roll to effect calendering of said coating, and means for receiving the web from said pair of rolls and supplying moisture thereto to replace moisture removed therefrom by said heated roll.

15. Coating apparatus for providing an advancing web with a coating consisting essentially of a finely divided substantially non-thermoplastic material and a finely divided thermoplastic binder material, comprising a driven backing drum, hood means defining a coating chamber overlying an angular portion of the surface of said drum, means defining entry and exit slots for the web with respect to said chamber, means including an entry duct leading to said entry slot for supplying to said chamber a mixture of said finely divided material, means including a plurality of charging wires extending through said chamber axially of said drum and in radially spaced overlying relation therewith for charging said finely divided materials, means for connecting said wires to a high voltage source, means for grounding said drums, means located ahead of said drum for maintaining a substantially constant supply of moisture in the web to increase the electric conductivity thereof, means guiding the moistened web into contact with said drum from a position to cause said charged materials to deposit on the web, a heated roll arranged to receive the uncoated side of the web therearound from said chamber to effect fusion of said thermoplastic material in the coating on the web, a chilled roll arranged to receive the uncoated side of the web from said heated roll to effect setting of said fused material, a pair of rolls forming a pressure nip arranged to receive the web from said chilled roll to effect calendering of said coating, and means for receiving the web from said pair of rolls and supplying moisture thereto to replace moisture removed therefrom by said heated roll.

16. Coating apparatus for providing an advancing web with a coating consisting essentially of a finely divided substantially non-thermoplastic material and a finely divided thermoplastic binder material, comprising a driven backing drum, hood means defining a coating chamber overlying an angular portion of the surface of said drum, means defining entry and exit slots for the web with respect to said chamber, means including an entry duct leading to said entry slot for supplying to said chamber a mixture of said finely divided material, means including a plurality of charging wires extending through said chamber axially of said drum and in radially spaced overlying relation therewith for charging said finely divided materials, means for connecting said wires to a high voltage source, means for grounding said drum, means guiding the web into contact with said drum to cause said charged materials to deposit on the web, means including a heater for effecting fusion and setting of said thermoplastic material in said coating to secure said non-thermoplastic material to the web, and means for receiving the web from said last named means and supplying moisture thereto to replace moisture removed therefrom by said heater.

17. Coating apparatus for providing an advancing web with a coating consisting essentially of a finely divided substantially nonthermoplastic material and a finely divided thermoplastic binder material, comprising a driven backing drum, hood means defining a coating chamber overlying an angular portion of the surface of said drum, means defining entry and exit slots for the web with respect to said chamber, means including a blower for supplying to said chamber a mixture of said finely divided material under pressure, an inlet duct for said material connected to said chamber adjacent said entry slot and of the same width as said chamber at the point of connection thereto, the sides of said inlet duct converging from said chamber and the front and back thereof diverging from said chamber at rates providing a substantially constant flow area therethrough a cylindrical pipe of substantially said constant flow area connecting said blower with said inlet duct to deliver said material thereto in a substantially uniformly distributed flow pattern, means including a plurality of charging wires extending through said chamber axially of said drum and in radially spaced overlying relation therewith for charging said finely divided materials, means for connecting said wires to a high voltage source, means for grounding said drum, means guiding the web into contact with said drum from a position angularly ahead of said entry slot to a position angularly beyond said exit slot to cause said charged materials to deposit on the web, and means effecting fusion and setting of said thermoplastic material in said coating to secure said nonthermoplastic material to the web.

18. Coating apparatus for providing an advancing web with a coating consisting essentially of a finely divided substantially nonthermoplastic material and a finely divided thermoplastic binder material, comprising a driven backing drum, hood means defining a coating chamber overlying an angular portion of the surface of said drum, means defining entry and exit slots for the web with respect to said chamber, means including a blower for supplying to said chamber a mixture of said finely divided material under pressure, means leading from said blower to said chamber including an inlet duct for said material connected to said chamber adjacent said entry slot and of the same width as said chamber at the point of connection thereto, the sides of said inlet duct converging from said chamber and the front and back thereof diverging from said chamber at rates providing a substantially constant flow area therethrough, means including a plurality of charging wires extending through said chamber axially of said drum and in radially spaced overlying relation therewith for charging said finely divided materials, means for connecting wires to a high voltage source, means for grounding said drum, means guiding the web into contact with said drum from a position angularly ahead of said entry slot to a position angularly beyond said exit slot to cause said charged materials to deposit on the web, an exit duct for surplus, said material leading from said chamber adjacent said exit slot, means connecting said exit duct with the suction side of said blower to return said surplus material thereto for recirculation to said chamber, auxiliary means for applying suction to said exit duct to prevent discharge of said surplus material through said exit slot, and means effecting fusion and setting of said thermoplastic material in said coating to secure said nonthermoplastic material to the web.

19. Coating apparatus for providing an advancing web with a coating consisting essentially of a finely divided substantially nonthermoplastic material and a finely divided thermoplastic binder material, comprising a driven backing drum, hood means defining a coating chamber overlying an angular portion of the surface of said drum, means defining entry and exit slots for the web with respect to said chamber, means including a blower for supplying to said chamber a mixture of said finely divided material under pressure, means leading from said blower to said chamber including an inlet duct for said material connected to said chamber adjacent said entry slot, means including a plurality of charging wires extending through said chamber axially of said drum and in radially spaced overlying relation therewith for charging said finely divided materials, means for connecting said wires to a high voltage source, means for grounding said drum, means guiding the web into contact with said drum from a position angularly ahead of said entry slot to a position angularly beyond said exit slot to cause said charged materials to deposit on the web, an exit duct for surplus, said material leading from said chamber adjacent said exit slot, means connecting said exit duct with the suction side of said blower to return said surplus material thereto for recirculation to said chamber, doctor means positioned to remove said material from the end portions of said drum laterally beyond the web and to direct such material into said exit duct, and means effecting fusion and setting of said thermoplastic material in said coating to secure said nonthermoplastic material to the web.

References Cited in the file of this patent
UNITED STATES PATENTS

| | | |
|---|---|---|
| 2,003,267 | Smith et al. | May 28, 1935 |
| 2,173,032 | Wintermute | Sept. 12, 1939 |
| 2,222,539 | Meston | Nov. 19, 1940 |
| 2,723,921 | Starkey | Nov. 15, 1955 |
| 2,811,135 | Hayford et al. | Oct. 29, 1957 |
| 2,876,737 | Carlson | Mar. 10, 1959 |

UNITED STATES PATENT OFFICE
CERTIFICATE OF CORRECTION

Patent No. 3,090,353                              May 21, 1963

Frederick W. Holt, Jr., et al.

It is hereby certified that error appears in the above numbered patent requiring correction and that the said Letters Patent should read as corrected below.

Column 1, line 43, for "eject" read -- effect --; column 2, line 14, for "rolls" read -- roll; --; column 5, line 43, for "foms" read -- forms --; column 14, line 8, after "therethrough" insert a comma; line 43, after "connecting" insert -- said --; same column 14, line 48, and column 15, line 2, after "surplus", each occurrence, strike out the comma.

Signed and sealed this 17th day of December 1963.

(SEAL)
Attest:
ERNEST W. SWIDER

EDWIN REYNOLDS

Attesting Officer                              Acting Commissioner of Patents